United States Patent [19]
Busby

[11] Patent Number: 5,947,499
[45] Date of Patent: Sep. 7, 1999

[54] BICYCLE FLEXIBLE JOINT

[75] Inventor: James S. Busby, Costa Mesa, Calif.

[73] Assignee: GT Bicycles, Inc., Longmont, Colo.

[21] Appl. No.: 08/779,134

[22] Filed: Jan. 6, 1997

Related U.S. Application Data

[63] Continuation-in-part of application No. 08/699,807, Aug. 19, 1996, Pat. No. 5,865,456, which is a continuation-in-part of application No. 08/662,249, Jun. 14, 1996, Pat. No. 5,797,613.

[51] Int. Cl.$^6$ ................................................ B62K 25/28
[52] U.S. Cl. ........................ 280/284; 267/270; 280/275; 280/283
[58] Field of Search .................................. 280/275, 276, 280/281.1, 283, 284, 286, 686; 180/227; 403/119; 267/246, 270, 271, 260, 47, 158

[56] References Cited

U.S. PATENT DOCUMENTS

| D. 372,002 | 7/1996 | Busby et al. .......................... D12/111 |
| 439,095 | 10/1890 | Becker . |
| 578,615 | 3/1897 | Travis . |
| 606,323 | 6/1898 | Wronksi . |
| 657,667 | 9/1900 | Mills . |
| 944,795 | 12/1909 | Leet et al. . |
| 1,047,430 | 12/1912 | Michaelson . |
| 1,257,761 | 2/1918 | Strand . |
| 1,298,958 | 4/1919 | Johnston . |
| 1,377,948 | 5/1921 | Wacker ................................ 280/275 |

(List continued on next page.)

FOREIGN PATENT DOCUMENTS

| 092015477 | 9/1992 | European Pat. Off. . |
| 9313974 | 7/1993 | European Pat. Off. . |
| 033294 | 4/1981 | Germany . |
| 428442 | 12/1947 | Italy . |
| 457480 | 5/1950 | Italy . |
| 5105168 | 5/1993 | Japan . |
| 897432 | 3/1985 | Russian Federation . |
| 7430 | of 1914 | United Kingdom . |
| 15332 | of 1916 | United Kingdom . |
| 220760 | 8/1924 | United Kingdom . |

OTHER PUBLICATIONS

1992 Cannondale Specs.; "Suspension Mountain Bicycles"; 4 pgs.
TREK 900 Series Specs.; "This Beauty Is a Beast"; 3 pgs.
Mountain Bike Action; Mar. 1992; "Fisher RS–1"; 4 pgs.
Mountain Bike Action; Feb. 1992; "Suspension Mania Strikes Cycling"; 3 pgs.
Mountain Bike Action; "Boulder Intrepid AL"; 2 pgs.
Mountain Bike Action; Jul. 1992; "Team ShockBlok"; 5 pgs.
Mountain Bike Action; "Beating Around the Bush"; Oct. 1992; pp. 10, 25–26, 28–29, 31, 36–37, 39–41, 44–45, 47, 58, 70, 73, 76–79, 123 and 130.
Bicycling; Nov. 1992; pp. 26–27, 58, 63–64 and 105.
Mountain Biking; "Roaming the Halls of the Bike Industry, Picking Up Interesting Tidbits"; Nov. 1992, vol. 6; No. 11; pp. 6–9, 25, 48–49, 65, 71, 73, 108–109, 115, 124, 129, 140,143, 163 and 169.
Mountain Biking; Dec. 1992; pp. 1–2, 5, 18, 44–49, 77, 127 and 160.

(List continued on next page.)

*Primary Examiner*—Anne Marie Boehler
*Attorney, Agent, or Firm*—Stetina Brunda Garred & Brucker

[57] ABSTRACT

A flexible joint for a vehicle frame having at least two (2) frame members. The flexible joint comprises a resilient, flexible member defining opposed ends and a longitudinal axis. Attached to respective ones of the opposed ends of the flexible member is a pair of adaptor members. The adaptor members are attachable to respective ones of the frame members such that the flexible member extends between and interconnects the frame members in a manner wherein the resilient bending of the flexible member along its longitudinal axis facilitates the pivotal movement of one of the frame members relative to the other of the frame members. The flexible member is further adapted to resist torsional movement along its longitudinal axis.

15 Claims, 2 Drawing Sheets

U.S. PATENT DOCUMENTS

| | | | |
|---|---|---|---|
| 1,412,012 | 4/1922 | Bruno . | |
| 1,594,079 | 7/1926 | Tanner . | |
| 2,547,993 | 4/1951 | Benz | 267/260 |
| 3,522,957 | 8/1970 | Topor | 280/283 |
| 3,917,313 | 11/1975 | Smith et al. | 280/284 |
| 3,982,770 | 9/1976 | Satoh et al. | 280/284 |
| 4,322,088 | 3/1982 | Miyakoshi et al. | 280/284 |
| 4,421,337 | 12/1983 | Pratt | 280/277 |
| 4,506,755 | 3/1985 | Tsuchida et al. | 180/227 |
| 4,529,056 | 7/1985 | Kreuz | 180/227 |
| 4,673,053 | 6/1987 | Tanaka et al. | 180/227 |
| 4,679,811 | 7/1987 | Shuler | 280/284 |
| 4,789,174 | 12/1988 | Lawwill | 280/284 |
| 4,951,791 | 8/1990 | Belil Creixell | 180/219 |
| 4,997,197 | 3/1991 | Shultz | 280/275 |
| 5,029,888 | 7/1991 | Allsop et al. | 280/281.1 |
| 5,080,384 | 1/1992 | Groendal et al. | 280/175 |
| 5,098,114 | 3/1992 | James | 280/284 |
| 5,121,937 | 6/1992 | Lawwill | 280/284 |
| 5,205,572 | 4/1993 | Buell et al. | 280/284 |
| 5,244,224 | 9/1993 | Busby | 280/284 |
| 5,259,637 | 11/1993 | Busby | 280/284 |
| 5,269,552 | 12/1993 | Yelverton | 280/283 |
| 5,306,036 | 4/1994 | Busby | 280/284 |
| 5,409,249 | 4/1995 | Busby | 280/284 |
| 5,441,292 | 8/1995 | Busby | 280/284 |

OTHER PUBLICATIONS

Mountain Biking; "Pass Press 93"; Jan. 1993; vol. 7; No. 1; pp. 32–33, 40, 45, 71, 75, 82–83, 115 and 117.

Mountain Bike Action; "Welcome to the Next Generation"; Jun. 1992; 9 pgs.

Mountain Bike Action; "Schwinn S.A.S.S."; May 1992; 7 pgs.

Offroad; Offroad Pro–Flex 550; 3 pgs.

Mountain Bike Action; "Litespeed Suspension"; Jul. 1992; 6 pgs.

Mountain & Citing Biking; "Slingshot"; 6 pgs.

Guide to Suspension and High Performance; "Suspension Speak"; vol. 3, 1992; pp. 9, 13–15, 17, 30–31, 36–37, 42–45, 47, 53 60, 69, 71, 76, 85–87, 92, 96, 98, 100, 108–112, 117 and 119.

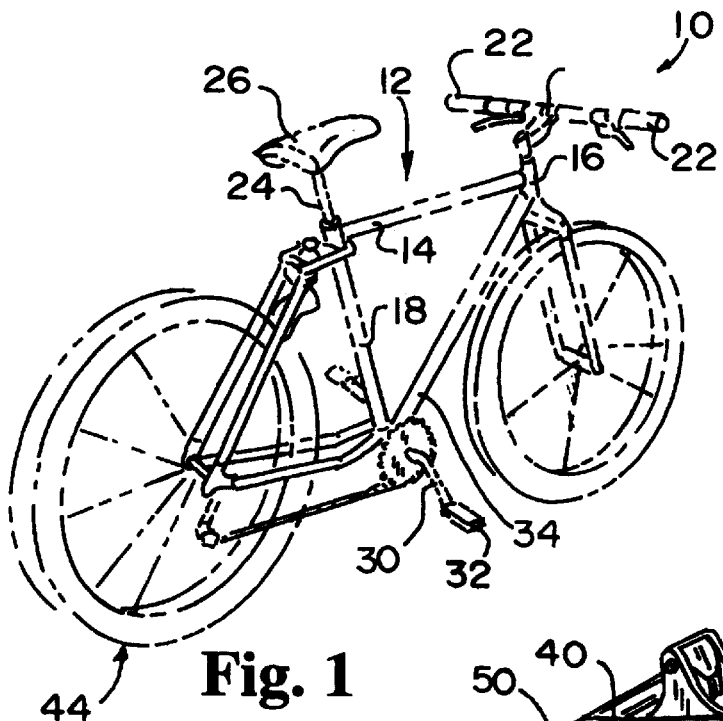
Fig. 1
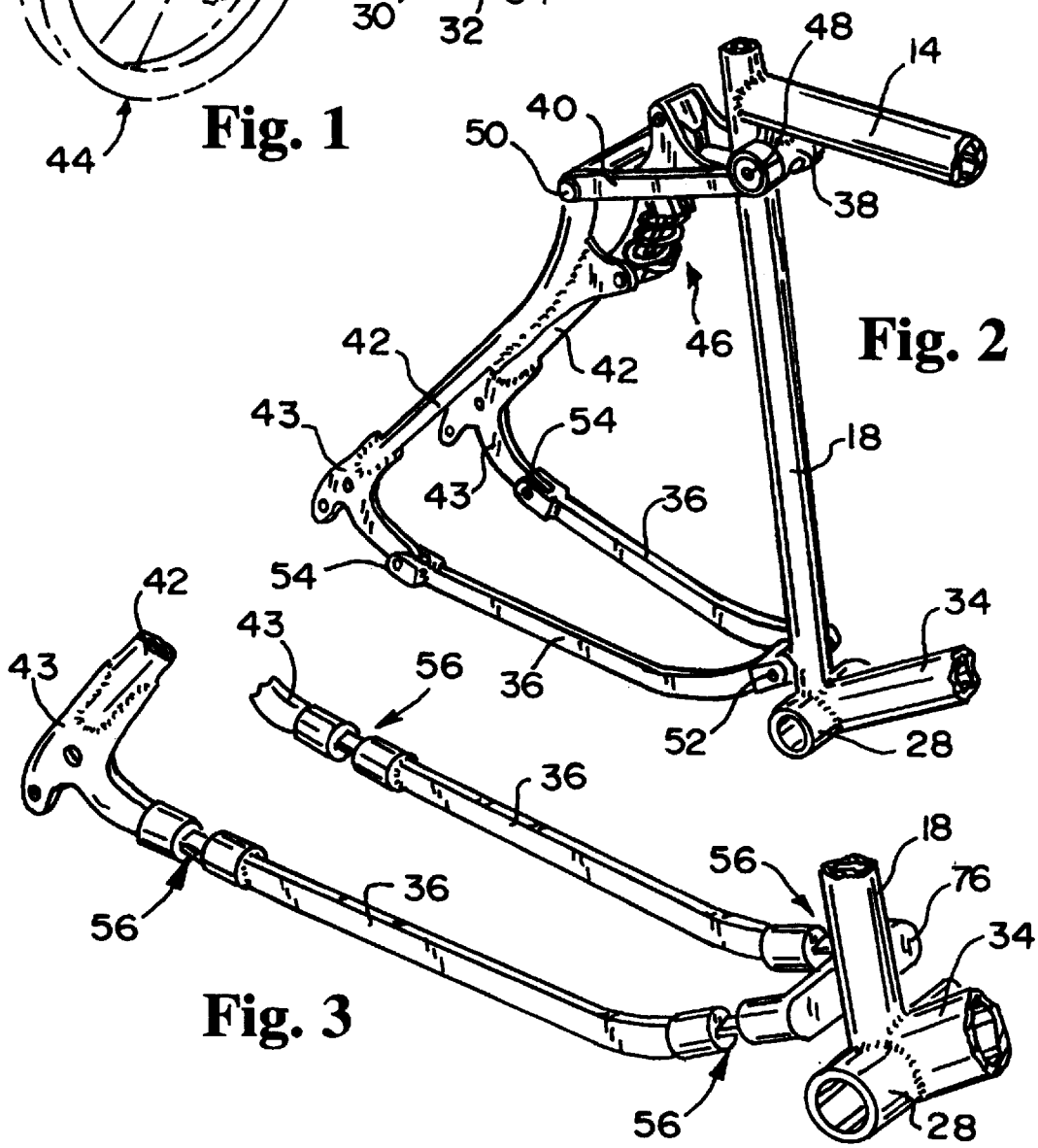
Fig. 2
Fig. 3

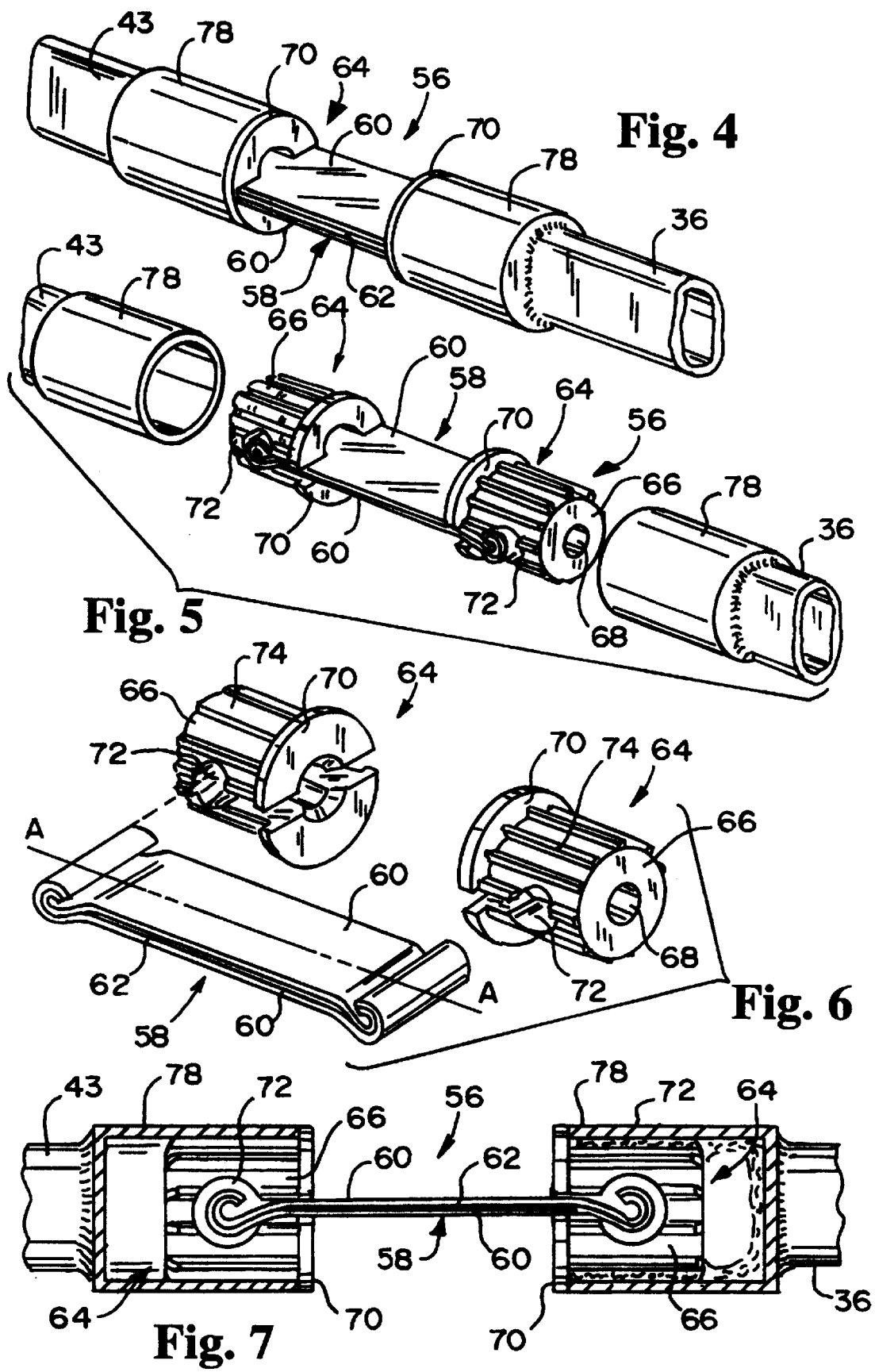

BICYCLE FLEXIBLE JOINT

FIELD OF THE INVENTION

The present application is a continuation-in-part of U.S. application Ser. No. 08/699,807, now U.S. Pat. No. 5,865,456, entitled BICYCLE FLEX JOINT WITH NON-TORSIONAL ENCASEMENT filed Aug. 19, 1996, which is a continuation-in-part of U.S. application Ser. No. 08/662,249, now U.S. Pat. No. 5,797,613, entitled BICYCLE FLEX JOINT filed Jun. 14, 1996. The present invention relates generally to bicycle frame construction, and more particularly to a flexible joint for allowing bicycle frame members to resiliently bend or flex about a particular axis, while mitigating the torsional movement of the frame members relative to each other.

BACKGROUND OF THE INVENTION

The primary structural component of a bicycle is the bicycle frame. Typically, the bicycle frame comprises an elongate top tube which is rigidly secured to and extends between a head tube and a seat tube. The head tube typically provides a structural base for the stem of the bicycle to which the handlebars are attached. The seat tube provides a base for a seat post which is generally telescopically received therewithin and to which is secured the saddle or seat of the bicycle. In typical bicycle frame construction, the seat tube includes a generally cylindrical axle-receiving bracket attached to the bottom end thereof which is adapted to receive a bottom bracket axle. The bottom bracket axle typically extends between and interconnects the cranks to which are attached to the pedals. Rigidly secured to and extending between the head tube and the cylindrical axle-receiving bracket is an elongate down tube.

In addition to the aforementioned structural components, rigidly secured to and extending rearwardly from the axle-receiving bracket are first and second chain stay members. Additionally, rigidly secured to and extending downwardly from the upper end of the seat tube are first and second seat stay members having lower ends which are rigidly secured to the back ends of respective ones of the first and second chain stay members. Typically, the lower ends of the seat stay members and the back ends of the chain stay members are interconnected in a manner adapted to receive the rear tire axle of the rear wheel. The head tube, seat tube, top tube, and down tube are typically secured to each other and to the axle-receiving bracket in a manner defining a main front triangle portion of the bicycle frame. The seat stay and chain stay members, when connected to the seat tube, axle-receiving bracket, and each other, typically define a back triangle portion of the bicycle frame.

The foregoing description generally represents the construction of conventional prior art bicycle frames. Typically, when such prior art frames are constructed, the aforementioned structural components are rigidly secured to each other through the use of welding or brazing techniques. Though this method of constructing the bicycle frame provides the resultant frame with structural integrity, the bicycle frame does not possess a suspension having shock absorbing characteristics. As will be recognized, the ride, comfort, and performance of the bicycle would be greatly enhanced if the bicycle frame were adapted to at least partially accommodate the shocks routinely encountered while riding the bicycle.

In recognition of the desirability of accommodating the shocks routinely encountered while riding the bicycle, prior art bicycle frames have been developed which include front and/or rear shock absorbing assemblies. However, such prior art bicycle frames, though having shock absorbing capabilities, possess certain deficiencies which detract from their overall utility. In this respect, such bicycle frames typically include multiple pivot joints, each of which generally comprises a pivot pin which extends through corresponding apertures formed at the ends of frame members of the bicycle frame which are to be pivotally connected to each other.

Though such construction provides for pivotal movement along a desired axis, it necessitates the forming apertures at the ends of the frame members which are to be joined to each other. Each aperture must be machined into a solid member or lug which is typically welded to the tubularly configured frame member. The solid members or lugs are secured to each of the tubular frame members to be joined so as to define a clevis. As will be recognized, such construction methodology inherently requires precision tooling and skilled labor. Thus, pivoting joints formed in accordance with such contemporary methodology are costly and comparatively difficult to fabricate. Such prior art pivoting joints also have an inherent requirement for maintenance such as cleaning and lubrication. These prior art pivoting joints are also susceptible to contamination, particularly since bicycles are commonly used in environments where they are exposed to various environmental contaminants such as dirt, sand, debris, etc.

As such, there exists a need in the prior art for a flexible joint for a bicycle frame which facilitates the resilient bending or flexion of the frame members interconnected thereby about a single desired axis, while mitigating the resilient bending or flexion of such frame members about all other axes, as well as mitigating torsional movement of the interconnected frame members relative to each other. The flexible joint constructed in accordance with the present invention is also adapted to eliminate the need for substantial maintenance, and is inexpensive to manufacture, thus facilitating easy assembly of the bicycle frame.

SUMMARY OF THE INVENTION

In accordance with the present invention, there is provided a flexible joint for a vehicle frame, and more particularly a bicycle frame which includes at least two (2) frame members. The flexible joint of the present invention comprises a resilient, flexible member which defines opposed ends and a longitudinal axis. Attached to respective ones of the opposed ends of the flexible member is a pair of adaptor members. The adaptor members are attachable to respective ones of the frame members such that the flexible member extends between and interconnects the frame members in a manner wherein the resilient bending or flexion of the flexible member along its longitudinal axis facilitates the pivotal movement of one of the frame members relative to the other of the frame members, or the pivotal movement of the frame members relative to each other. The flexible member is further adapted to resist torsional movement along its longitudinal axis.

The flexible member itself comprises at least one elongate plate, and preferably a pair of plates which are disposed in stacked relation to each other. The plates each have a generally rectangular configuration and include a pair of longitudinal sides and a pair of lateral sides, with the lateral sides of the plates defining respective ones of the opposed ends of the flexible member. The lateral sides of the plates are tubular, and have generally circular cross-sectional configurations. The plates are preferably fabricated from a metal material, and more particularly spring steel, though they may alternatively be fabricated from a composite material.

In the preferred embodiment, the adaptor members of the flexible joint each comprise a body portion which defines opposed ends and includes a bore extending longitudinally therethrough. Additionally, extending laterally through one end of the body is a slot which is complementary to and sized and configured to receive a respective one of the opposed ends of the flexible member. Formed about the end of the body portion including the slot extending laterally therethrough is a flange portion. The body portion of each adaptor member preferably has a generally cylindrical configuration, with the bore extending axially therethrough and the flange portion extending radially outward therefrom. In this respect, the slot extends in generally perpendicular relation to the axis of the bore. Additionally, the body portion defines an outer surface having a plurality of splines formed thereon and extending longitudinally therealong. Though preferably being cylindrical and having a circular cross-sectional configuration, the body portion may have alternative cross-sectional configurations (e.g., square, triangular, oval, etc.). Each of the adaptor members is preferably fabricated from a metal material, and more particularly aluminum.

BRIEF DESCRIPTION OF THE DRAWINGS

These, as well as other features of the present invention, will become more apparent upon reference to the drawings wherein:

FIG. 1 is a rear perspective view of a bicycle including a bicycle frame which incorporates pivot joints constructed in accordance with the prior art;

FIG. 2 is an enlarged, partial perspective view of a portion of the rear suspension system of the bicycle frame shown in FIG. 1 incorporating pivot joints constructed in accordance with the prior art to facilitate the pivotal movement of various frame members of the bicycle frame relative to each other;

FIG. 3 is a partial perspective view of a bicycle frame incorporating the flexible joints constructed in accordance with the present invention to facilitate the pivotal movement of various frame members of the bicycle frame relative to each other;

FIG. 4 is an enlarged, partial perspective view of the flexible joint of the present invention as used to interconnect adjacent frame members of the bicycle frame to each other;

FIG. 5 is an exploded view of the flexible joint and frame members of the bicycle frame as shown in FIG. 4;

FIG. 6 is an exploded view of the flexible joint constructed in accordance with the present invention; and FIG. 7 is a partial cross-sectional view illustrating the manner in which the flexible joint of the present invention interconnects adjacent frame members of the bicycle frame to each other.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a bicycle 10 including a bicycle frame 12. The bicycle frame 12 of the bicycle 10 includes a plurality of frame members, and more particularly an elongate top tube 14 which is rigidly secured to and extends between a head tube 16 and a seat tube 18. The head tube 16 typically provides a structural base for the stem 20 of the bicycle 10 to which the handlebars 22 are attached. The seat tube 18 provides a base for a seat post 24 which is telescopically received therewithin and to which is secured the saddle or seat 26 of the bicycle 10. In the bicycle frame 12, the seat tube 18 includes a generally cylindrical axle-receiving bracket 28 attached to the bottom end thereof which is adapted to receive a bottom bracket axle. The bottom bracket axle extends between and interconnects the cranks 30 to which are attached the pedals 32. Rigidly secured to and extending between the head tube 16 and the axle-receiving bracket 28 is an elongate downtube 34.

In addition to the aforementioned frame members, the bicycle frame 12 further comprises a pair of chain stay members 36, the front ends of which are connected to the seat tube 18. Additionally, connected to a link mount 38 rigidly attached to the seat tube 18 and/or top tube 14 is the front end of an upper link 40. Connected to the back end of the upper link 40 are the upper ends of a pair of seat stay members 42, the lower ends of which include a pair of axle mounting members 43 rigidly secured thereto for accommodating the axle of the rear wheel 44 of the bicycle 10. The axle mounting members 43 are connected to respective ones of the back ends of the chain stay members 36. Connected to and extending between the upper link 40 and seat stay members 42 is a shock absorber 46.

The chain stay members 36, upper link 40, seat stay members 42, axle mounting members 43 and shock absorber 46 of the bicycle frame 12 collectively define a shock absorbing rear suspension system of the bicycle 10. In this rear suspension system, the front end of the upper link 40 is pivotally connected to the link mount 38 via a first pivot joint 48, with the upper ends of the seat stay members 42 being pivotally connected to the back end of the upper link 40 via a second pivot joint 50. Additionally, the front ends of the chain stay members 36 are pivotally connected to the seat tube 18 via a third pivot joint 52, with the back ends of the chain stay members 36 being pivotally connected to respective ones of the axle mounting members 43 via fourth pivot joints 54. The rear suspension system of the bicycle 10 functions as described in U.S. Pat. No. 5,441,292, the disclosure of which is incorporated herein by reference.

The pivot joints 48, 50, 52, 54 as shown in FIGS. 1 and 2 are constructed in accordance with prior art techniques and, in the case of the first, second and third pivot joints 48, 50, 52, essentially comprise fasteners such as pivot pins which are extended through coaxially aligned apertures disposed within the corresponding ends of adjacent frame members of the bicycle frame 12. The fourth pivot joints 54 each comprise a clevis arrangement wherein a pivot pin is extended through the coaxially aligned apertures of a pair of clevis mounts attached to corresponding ends of adjacent frame members of the bicycle frame 12. Though the pivot joints 48, 50, 52, 54 facilitate the pivotal movement of certain frame members of the bicycle frame 12 relative to each other, they possess the previously described deficiencies. Thus, in accordance with the present invention, the pivot joints 48, 50, 52, 54 are replaced by a flexible joint 56, the precise structure and function of which will now be described with reference to FIGS. 3–7.

Referring now to FIGS. 3–7, the flexible joint 56 of the present invention for incorporation into the bicycle frame 12 of the bicycle 10 comprises a resilient, flexible member 58 which defines opposed ends and a longitudinal axis A. The flexible member 58 comprises at least one, and preferably a pair of elongate plates 60 which are disposed in stacked relation to each other. The plates 60 each have a generally rectangular configuration, and include a pair of longitudinal sides and a pair of lateral sides, with the lateral sides of the plates 60 defining respective ones of the opposed ends of the flexible member 58.

As best seen in FIG. 6, the lateral sides of the plates 60 are tubular and have generally circular cross-sectional configurations. In this respect, to facilitate the formation of the lateral sides of the plates 60 with the tubular configurations, the opposed end portions of the plates 60 are bent or rolled inwardly subsequent to the plates 60 being stacked upon each other. As best seen in FIG. 7, the inwardly rolled or bent opposed end portions of the plates 60 overlap and are in direct contact with each other, with the distal edges thereof being substantially flush. Though the central portions of the plates 60 extending between the inwardly rolled or bent end portions extend in generally parallel relation to each other, they are not in direct contact, but rather are separated by a narrow space or gap 62, the use of which will be described in more detail below.

As will be recognized, the rolling or bending of the opposed end portions of the plates 60 inwardly in the manner shown in FIGS. 5–7 maintains the plates 60 in fixed relation to each other (i.e., rigidly secures the plates 60 to each other). In the preferred embodiment, the plates 60 are each fabricated from a resilient metal material, and preferably spring steel. However, those of ordinary skill in the art will recognize that alternative materials such as a composite material having characteristics of resiliency may be used in the fabrication of the plates 60.

In addition to the flexible member 58, the flexible joint 56 comprises an identically configured pair of adaptor members 64 which are attached to respective ones of the tubularly configured opposed ends of the flexible member 58. The adaptor members 64 each comprise a cylindrically configured body portion 66 defining opposed ends and a bore 68 extending axially therethrough. Formed about and extending radially outward from one end of the body portion 66 is a flange portion 70. Additionally, extending laterally through the end of the body portion 66 having the flange portion 70 formed thereabout is a slot 72 which is sized and configured to receive a respective one of the opposed end portions of the flexible member 58 in a manner which will be described in more detail below.

As further seen in FIGS. 6 and 7, the slot 72 of each adaptor member 64 comprises a narrow region which extends from one end of the body portion 66 and terminates into an enlarged region having a generally circular configuration. The axis of the circularly configured enlarged region of the slot 72 extends in generally perpendicular relation to the bore 68 of the body portion 66. The opposed walls of the narrow region of each slot 72 are not planar, but rather include a concave trough disposed centrally therein attributable to the inclusion of the bore 68 within the body portion 66. Due to the inclusion of the slot 72 within the body portion 66, the flange portion 70 is not continuous, but rather is divided into two (2) semi-circularly configured segments.

The attachment of the flexible member 58 to the adaptor members 64 is facilitated by the advancement of the opposed, tubularly configured ends of the flexible member 58 into respective ones of the enlarged regions of the slots 72. When the tubular ends of the flexible member 58 are received into the enlarged regions of the slots 72, portions of the flexible member 58 adjacent the tubular ends thereof are received into respective ones of the narrow regions of the slots 72. The flexible joint 56 defined by the attachment of the adaptor members 64 to the flexible member 58 is best shown in FIG. 5.

The body portion 66 of each adaptor member 64 further comprises a plurality of splines 74 which are formed on and extend longitudinally along the outer surface thereof in equidistantly spaced relation to each other. As seen in FIG. 5, the lateral widths of the plates 60 are such that when the opposed end portions of the flexible member 58 are inserted into the slots 72 in the aforementioned manner, the plates 60 do not extend laterally beyond the outermost edges of the splines 74. The splines 74 are used to aid in securing the flexible joint 56 to the bicycle frame 12 in a manner which will also be described in more detail below.

The adaptor members 64 are each preferably fabricated from a metal material, and more particularly aluminum, though other materials may also be employed for the adaptor members 64 in the flexible joint 56. Additionally, though the body portions 66 of the adaptor members 64 are preferably cylindrically configured (i.e., have circular cross-sectional configurations) those of ordinary skill in the art will recognize that the body portions 66 may be formed to have alternative cross-sectional configurations (e.g., square, triangular, oval, etc.).

In FIGS. 3–5 and 7, the flexible joints 56 constructed in accordance with the present invention are shown as being used to facilitate the attachment of the front ends of the chain stay members 36 to a mounting bracket 76 which is itself rigidly attached to the seat tube 18, and the back ends of the chain stay members 36 to respective ones of the axle mounting members 43. More particularly, in the bicycle frame 12 incorporating the flexible joints 56, the back ends of the chain stay members 36 each include a hollow, cylindrically configured connector sleeve 78 rigidly attached thereto via a welded or brazed connection. Connector sleeves 78 are also rigidly attached to the front ends of respective ones of the axle mounting members 43 via welded or brazed connections. Subsequent to the insertion of the flexible member 58 into the adaptor members 64 in the aforementioned manner, the extension of a pair of flexible joints 56 between the chain stay members 36 and the axle mounting members 43 is facilitated by inserting the adaptor members 64 of each flexible joint 56 into respective ones of an opposed, corresponding pair of connector sleeves 78 attached to the chain stay members 36 and axle mounting members 43. As best seen in FIGS. 4 and 7, the insertion of each adaptor member 64 into a respective connector sleeve 78 is limited by the abuttment of the flange portion 70 against the distal rim of the connector sleeve 78.

In the flexible joint 56 of the present invention, the inner diameter of each connector sleeve 78 only slightly exceeds the maximum diameter of the adaptor member 64 as defined by the outer surfaces of the splines 74 disposed on the body portion 66 thereof. In this respect, the body portion 66 of the adaptor member 64 including the spline 74 thereon is adapted to be slidably inserted into a respective connector sleeve 78. As seen in FIG. 7, prior to such insertion an adhesive or similar bonding agent is applied to the outer surface of the body portion 66 between the splines 74. Subsequent to the insertion of the body portion 66 including the adhesive applied thereto into the connector sleeve 78, the curing/hardening of the adhesive facilitates the rigid attachment of the adaptor member 64 to the sleeve 78, and hence a frame member of the bicycle frame 12. When the adaptor members 64 are inserted into the connector sleeves 78, the flexible member 58 is prevented from laterally shifting within the slots 72 due to the abutment of the opposed end portions of the flexible member 58, and in particular the longitudinal sides thereof, against the inner surfaces of the connector sleeves 78.

When the adaptor members 64 are attached to corresponding pairs of the connector sleeves 78 of the chain stay members 36 and axle mounting members 43 in the aforementioned manner, the flexible members 58 extends between and interconnect the chain stay members 36 and axle mounting members 43 in a manner wherein the resilient bending or flexion of the flexible members 58 along their longitudinal axes A facilitates the pivotal movement of one pair of the interconnected frame members relative to the other pair, or the pivotal movement of the interconnected frame members relative to each other. Advantageously, though being adapted to resiliently bend along its longitudinal axis A, each flexible member 58 is adapted to resist torsional movement along its longitudinal axis A.

As further seen in FIG. 3, connector sleeves 78 are also rigidly attached to the front ends of respective ones of the chain stay members 36, and to the opposed ends of the mounting bracket 76. In this respect, the interconnection of the front ends of the chain stay members 36 to the mounting bracket 76 through the use of the flexible joints 56 is accomplished in the same manner as previously described in relation to the interconnection of the back ends of the chain stay members 36 to the axle mounting members 43. Though not shown, those of ordinary skill in the art will recognize that the flexible joints 56 constructed in accordance with the present invention may also be integrated into other portions of the bicycle frame 12 as an alternative to a conventional, prior art pivot joint. For example, flexible joints 56 may be substituted for the first pivot joint 48 and second pivot joint 50, in addition to the third and fourth pivot joints 52, 54 as previously described. Additionally, the flexible joints 56 constructed in accordance with the present invention may be incorporated into the frames of vehicles other than for bicycles.

The flexible joint 56 of the present invention provides a less costly and easier to assemble replacement for contemporary pivot joints. It also provides an excellent means for mitigating undesirable bending and/or torsion of one frame member of the bicycle frame 12 relative to another frame member, while simultaneously facilitating bending of the frame members along a desired axis relative to each other. The flexible joint 56 of the present invention requires less maintenance than contemporary pivot joints which incorporate pivot pins in that it does not require periodic lubrication and is not susceptible to environmental contamination. The present flexible joint 56 is also rugged enough to withstand the substantial forces applied to the bicycle frame 12 during pedalling and riding, particularly in the conditions frequently encountered in all terrain and/or mountain riding.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A flexible joint for a vehicle frame having at least two frame members, said flexible joint comprising:

a resilient, flexible member defining opposed ends and a longitudinal axis; and a pair of adaptor members attached to respective ones of the opposed ends of the flexible member, each of the adaptor members comprising:

a body portion defining opposed ends, the body portion including a bore extending longitudinally therethrough and a slot extending laterally through one end thereof; and a flange portion formed about the end of the body portion including the slot extending laterally therethrough, the slot being sized and configured to receive a respective one of the opposed ends of the flexible member;

said adaptor members being attachable to respective ones of the frame members such that the flexible member extends between and interconnects the frame members in a manner wherein the resilient bending of the flexible member along the longitudinal axis facilitates the pivotal movement of one of the frame members relative to the other of the frame members, said flexible member being adapted to resist torsional movement along the longitudinal axis.

2. The flexible joint of claim 1 wherein said flexible member comprises at least one elongate plate.

3. The flexible joint of claim 2 wherein the flexible member comprises a pair of plates disposed in stacked relation to each other.

4. The flexible joint of claim 3 wherein the plates are each fabricated from a metal material.

5. The flexible joint of claim 4 wherein the plates are each fabricated from spring steel.

6. The flexible joint of claim 3 wherein the plates are each fabricated from a composite material.

7. The flexible joint of claim 3 wherein said plates each have a generally rectangular configuration and include a pair of longitudinal sides and a pair of lateral sides, the lateral sides of said plates defining respective ones of the opposed ends of the flexible member.

8. The flexible joint of claim 7 wherein the lateral sides of the plates are tubular and have generally circular cross-sectional configurations.

9. The flexible joint of claim 1 wherein said body portion has a generally cylindrical configuration, with said bore extending axially therethrough and said flange portion extending radially outward therefrom.

10. The flexible joint of claim 10 wherein said body portion defines an outer surface having a plurality of splines formed thereon and extending longitudinally therealong.

11. The flexible joint of claim 1 wherein said adaptor members are each fabricated from a metal material.

12. The flexible joint of claim 11 wherein said adaptor members are each fabricated from aluminum.

13. The flexible joint of claim 2 wherein the plate is fabricated from a metal material.

14. The flexible joint of claim 2 wherein the plate is fabricated from a composite material.

15. A flexible joint for a vehicle frame having at least two frame members, the flexible joint comprising:

a resilient, flexible member defining opposed ends and a longitudinal axis, the flexible member comprising a pair of generally rectangular plates which are disposed in stacked relation to each other and each include a pair of longitudinal sides and a pair of tubular lateral sides which have generally circular cross-sectional configurations and define respective ones of the opposed ends of the flexible member; and a pair of adaptor members attached to respective ones of the opposed ends of the flexible member;

the adaptor members being attachable to respective ones of the frame members such that the flexible member extends between and interconnects the frame members in a manner wherein the resilient bending of the flexible member along the longitudinal axis facilitates the pivotal movement of one of the frame members relative to the other of the frame members, the flexible member being adapted to resist torsional movement along the longitudinal axis.

* * * * *